No. 623,318. Patented Apr. 18, 1899.
T. B. KINRAIDE.
ELECTRICAL SPARK GAP.
(Application filed Sept. 24, 1898.)
(No Model.)
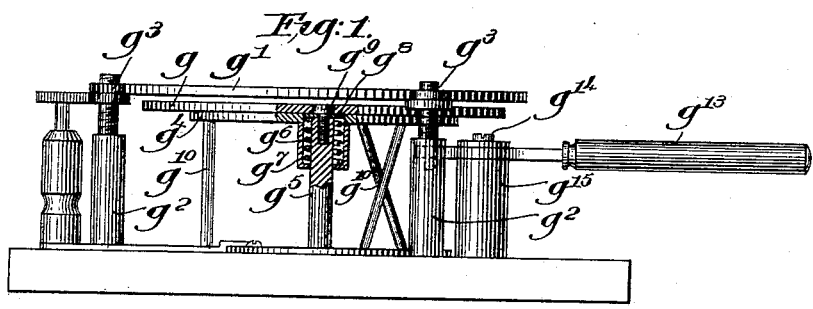
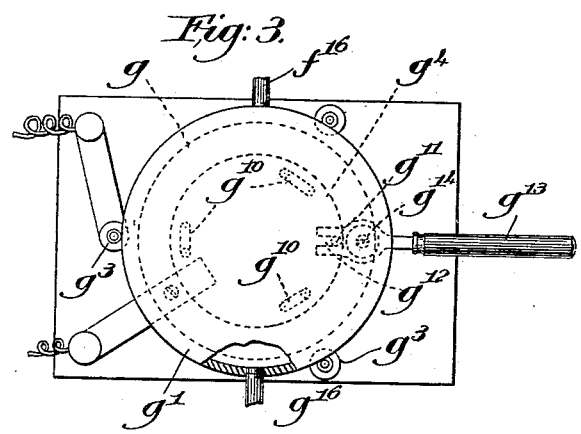
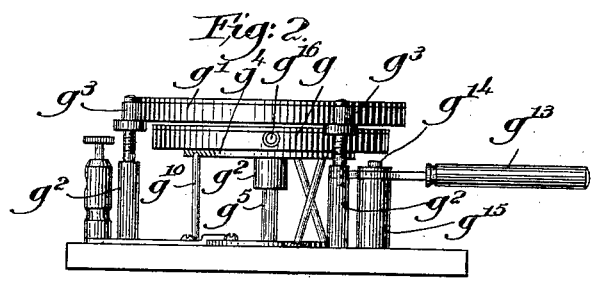
Witnesses,
Edward H. Allen.
James M. Urquhart.
Inventor,
Thomas B. Kinraide
by Crosby Gregory
Atty's.

UNITED STATES PATENT OFFICE.

THOMAS B. KINRAIDE, OF BOSTON, MASSACHUSETTS.

ELECTRICAL SPARK-GAP.

SPECIFICATION forming part of Letters Patent No. 623,318, dated April 18, 1899.

Application filed September 24, 1898. Serial No. 691,758. (No model.)

*To all whom it may concern:*

Be it known that I, THOMAS B. KINRAIDE, of Boston, county of Suffolk, State of Massachusetts, have invented an Improvement in Electric Spark-Gaps, of which the following description, in connection with the accompanying drawings, is a specification, like letters on the drawings representing like parts.

The more recent developments in electrical matters, and particularly in the line of experimental research in connection with static electricity, have developed conditions requiring the discharge of such enormous potentials and amperage as to render the apparatus heretofore provided for such purposes inefficient and largely useless, for the reason that these enormous discharges which the electrician frequently desires to experiment or deal with very quickly render inoperative or destroy such usual apparatus.

Accordingly it is the object of my present invention to provide a practically indestructible discharge apparatus to meet the more exacting requirements of the present day; and to that end I provide a spark-gap which is virtually self-recuperative and comprises opposite parallel discharge-surfaces of considerable area, which, besides their practically indestructible character, possess numerous very important advantages, all as will be more fully pointed out in the course of the following detailed description of the apparatus, reference being had to the accompanying drawings, illustrative of preferred embodiments thereof.

In the drawings, Figure 1 represents in side elevation a simple form of my improved spark-gap. Fig. 2 is a similar view showing a modification. Fig. 3 is a top plan view of the form of apparatus shown in Fig. 2.

While the spark-gap which constitutes my invention and which I will now describe is primarily intended for use in discharging condensers, as shown in my application, Serial No. 679,799, filed May 5, 1898, it will be understood that it is not limited thereto, but may be employed in various other relations.

I provide electrodes preferably in the form of opposite parallel disks $g$ $g'$, the air-gap between whose plane surfaces constitutes the spark-gap, the extended area of these electrodes preventing the tendency of the condenser, for example, to discharge until it has reached its maximum charge and also causing the discharge to be exceedingly sudden when it does take place and the disks not being liable to become unduly heated.

The spark-gap constitutes virtually a self-recuperative or indestructible condenser, as it were, the parallel and preferably plane metallic surfaces $g$ $g'$ being the discharge-surfaces, which discharge through or across the intervening air dielectric. The air-gap is broken through when the voltage has exerted a sufficient strain upon the air to rupture it. The larger the disks are the greater condenser capacity will they have, and hence the farther apart they will spark.

At each discharge of the condenser a small portion of the plates $g$ $g'$ is oxidized, the successive discharges producing very thin oxidation here and there until the entire surfaces of the two disks are completely oxidized. Suitable means is provided for accurately adjusting these plates relatively to each other and regulating their distance apart, or, in other words, for controlling the resistance of the intervening gaseous dielectric, and, referring to the drawings, where I have shown a preferred means for accomplishing my object, it will be seen that I provide a plurality of posts $g^2$, threaded at their upper ends and carrying shouldered nuts $g^3$, on the shoulders of which is placed the top disk $g'$. The opposite plate $g$ rests on a support or table $g^4$ and is mounted loosely on a post $g^5$, being normally held downwardly by a spring $g^6$, contained in a hanger or housing $g^7$, depending from the table $g^4$, said spring bearing at one end against the flanged lower end of the hanger $g^7$ and at its other end bearing against a washer $g^8$, retained by a screw $g^9$, whose head enters a hole or recess in the plate $g$ for centering the latter.

The plate $g$ is provided on its under side with a plurality of recesses or sockets, herein shown as three in number, which receive props or struts $g^{10}$, projecting upwardly from the base of the instrument. These props $g^{10}$ are of precisely equal length, so that they support the plate $g$ in absolute parallelism to its opposite plate $g'$. The support $g^4$ has depending from its lower side a stud $g^{11}$, which is engaged by the bifurcated end $g^{12}$ of a lever $g^{13}$, pivoted at $g^{14}$ to a post $g^{15}$ on the base.

By this provision the most delicate adjustment is possible simply by swinging the lever $g^{13}$ one way or the other, so as to incline the struts $g^{10}$ more or less, and thereby increase or decrease the distance between the plates $g\ g'$, the nuts $g^8$ being depended upon for the coarser adjustments of the plates.

In Figs. 2 and 3 I have shown the plates $g\ g'$ as hollow and provided with water-circulation pipes $g^{16}$ in order that they may be absolutely prevented from all heating under extraordinary conditions. Under usual conditions, however, this provision is entirely unnecessary, it being sufficient simply to provide the plates, as shown in Fig. 1.

When the adjacent surfaces of the plates have become entirely oxidized, the plates may be turned over and their opposite sides used, and when both sides have become oxidized they may be readily removed and scoured off without destroying any of their adjustments.

My apparatus makes possible the sudden discharge of a condenser after the latter has reached a certain predetermined point, and said discharge is of great volume or large amperage and of a very sudden and abrupt nature, as the current will not break across the spark-gap until it cannot help doing so, and when it does do so the discharge takes place with a minimum heating effect, not interfering with the efficiency, with very rapid and with very short and sharp oscillations incapable of being obtained between a ball or point discharge gap.

The adjustment of the plates relatively to each other regulates the amperage-discharge of the instrument being discharged.

Having described my invention, what I claim, and desire to secure by Letters Patent, is—

1. A spark-gap of the kind described for use in a condenser-circuit, said spark-gap presenting opposite parallel discharge-surfaces of relatively large areas and means for regulating the discharge distance between said parallel surfaces, whereby a condenser charge may be automatically governed, substantially as described.

2. The herein-described spark-gap comprising opposite electrodes presenting parallel discharge-surfaces, one of said electrodes being supported on three or more struts of equal length, and means for rotating said strut-supported electrode about its center, whereby its adjustment may be varied to and from the opposite electrode, substantially as described.

3. A spark-gap, comprising two permanent large superficial areas parallel to each other, constituting opposite discharge-surfaces, and an interposed gaseous dielectric, said discharge-surfaces having condenser capacity for breaking down the intervening dielectric, and the latter automatically restoring or renewing itself, substantially as described.

4. A spark-gap comprising opposite hollow plates or disks having parallel discharge-surfaces, means for regulating the discharge distance between said surfaces, and circulation-pipes entering the same, whereby a circulation of water may be maintained for keeping the plates or disks cool, substantially as described.

5. A spark-gap comprising three or more posts, shoulders adjustable thereon, a plate or disk supported on said shoulders, a second plate below the same, a support therefor, three or more upright struts loosely engaging said support, and means to rotate said support about its center, whereby said struts are simultaneously and similarly moved for varying the distance apart of said plates, substantially as described.

6. A spark-gap comprising a central post, a plurality of supporting-posts, two plates, one carried by said supporting-posts and the other adjacent said central post, three or more similar struts supporting said lower plate, a spring maintaining said struts in proper supporting relation, and means to rotate the lower plate on said central post, substantially as described.

7. A spark-gap comprising a plurality of supporting-posts, two plates, the lower plate being pivotally mounted, three or more similar struts supporting said lower plate, and the upper plate being supported by said supporting-posts, a lever pivotally mounted adjacent said lower plate and loosely connected therewith at its inner end for rotating said plate and tipping said struts, substantially as described.

8. A spark-gap comprising a central post, a plurality of supporting-posts, two plates, the lower plate being pivotally mounted concentrically to said central post, a hanger depending adjacent said post, a spring between said post and hanger and engaging the hanger at its lower end and held by the post at its upper end, three or more similar struts supporting said lower plate, and the upper plate being supported by said supporting-posts, a lever pivotally mounted adjacent said lower plate and loosely connected therewith at its inner end for rotating said plate and tipping said struts, substantially as described.

In testimony whereof I have signed my name to this specification in the presence of two subscribing witnesses.

THOMAS B. KINRAIDE.

Witnesses:
GEO. H. MAXWELL,
ALEXANDER C. PROUDFIT.